(12) United States Patent
Wu (10) Patent No.: US 7,799,154 B2
(45) Date of Patent: Sep. 21, 2010

(54) CONCRETE REINFORCEMENT

(75) Inventor: Yufei Wu, Kowloon (HK)

(73) Assignee: City University of Hong Kong, Hong Kong (HK)

( * ) Notice: Subject to any disclaimer, the term of this patent is extended or adjusted under 35 U.S.C. 154(b) by 883 days.

(21) Appl. No.: 11/479,677

(22) Filed: Jun. 30, 2006

(65) Prior Publication Data

US 2008/0000571 A1    Jan. 3, 2008

(51) Int. Cl.
*E04B 2/00* (2006.01)
*E04F 13/07* (2006.01)
*B32B 7/04* (2006.01)
*B32B 7/08* (2006.01)

(52) U.S. Cl. .............................. 156/71; 156/91; 156/92; 52/309.1; 52/506.05

(58) Field of Classification Search .................... 156/71, 156/91, 92; 428/408, 902; 52/293.2, 293.3, 52/309.1, 506.01, 506.05, 736.3, 738.1
See application file for complete search history.

(56) References Cited

U.S. PATENT DOCUMENTS

| | | | | |
|---|---|---|---|---|
| 3,490,329 A | * | 1/1970 | Pratorius | 411/441 |
| 4,287,656 A | * | 9/1981 | Gassman et al. | 29/432 |
| 5,640,825 A | * | 6/1997 | Ehsani et al. | 52/746.1 |
| 6,418,684 B1 | * | 7/2002 | Morton | 52/293.2 |
| 6,490,834 B1 | * | 12/2002 | Dagher | 52/506.01 |

FOREIGN PATENT DOCUMENTS

CN    1743627 A    3/2006

\* cited by examiner

*Primary Examiner*—Philip C Tucker
*Assistant Examiner*—Sing P Chan
(74) *Attorney, Agent, or Firm*—Heslin Rothenberg Farley & Mesiti P.C.; Victor A. Cardona, Esq.

(57) ABSTRACT

A method of reinforcing a concrete structure includes attaching an amount of reinforcing material onto a concrete or masonry substrate and attaching at least one cover plate on top of the reinforcing material onto the substrate.

16 Claims, 7 Drawing Sheets

Push against fastener and concrete pulled out    FRP Perpendicular movement    FRP longitudinal slip

CONCRETE REINFORCEMENT

FIELD OF INVENTION

The present invention describes improved methods of reinforcing concrete structures. Specifically the invention describes a method of reinforcing concrete structures by combining an externally bonded FRP (fibre reinforced plastic) configuration with the mechanical fastening of cover plates on a concrete structure.

BACKGROUND

There is a need for a dependable mechanism for increasing the shear and flexural strengths of in-service concrete structures. This need is especially acute in ageing buildings, highways having heavy traffic, railroad bridges, and other transport related structures.

Adhesively attaching FRP sheets, laminates or strips to concrete is the most common and effective method for the strengthening of concrete structures (this is commonly referred to as externally bonded FRP, or EB-FRP). Using this method, the strength of the FRP materials is transmitted into the concrete members through adhesive bonding, however the relatively weak interface by surface adhesion between the FRPs and the concrete limits the efficacy of the method. As a result, tension failure is usually a premature, sudden and brittle detachment of the FRP from a concrete substate (unless small quantities of FRP are used).

Mechanical fastening is another technology used to bond reinforcing materials to concrete structures. Mechanical fastening relies on the bearing of the attaching material on the fasteners to transmit the interface shear, for example in steel plating the interface shear that causes the tension force in the steel plate is transmitted into the concrete substrate through the bearing of the plate holes on the bolts that are anchored into the concrete. However, mechanical fastening is not easily used with FRP materials, because FRPs do not have sufficient bearing strength. Mechanical anchors often cut through the FRP sheet and cause longitudinal splitting of FRP sheets under loading.

It is an object of the invention to provide an improved or alternative method of reinforcing concrete structures using fiber reinforced plastic.

SUMMARY OF THE INVENTION

In a first aspect the invention broadly describes a method of reinforcing a concrete structure comprising Attaching an amount of reinforcing material onto a concrete or masonry substrate; and Attaching at least one cover plate on top of the reinforcing material onto the substrate.

In a preferred embodiment more than one cover plate is attached to the external surface of the concrete substrate.

Preferably the reinforcing material is attached to the concrete substrate by means of an adhesive, more preferably an epoxy resin.

In a preferred embodiment, the cover plate is a metal cover plate, preferably a steel cover plate.

Preferably the plane of the reinforcing material and the plane of the at least one cover plates are parallel, or are substantially parallel.

In a particularly preferred embodiment at least one cover plate is anchored into the substrate. Preferably each cover plate is nailed, or otherwise anchored to the substrate. In a preferred embodiment each cover plate is anchored to the substrate by two or more nails. Holes may be are drilled into the substrate prior to the attachment the cover plate(s); alternatively the nails could be forced into the substrate without the prior drilling of holes (for example using a Ramset™ gun. Concrete nails are preferred.

In a second aspect the invention broadly describes a method of reinforcing a concrete structure comprising Attaching an amount of reinforcing material onto a substrate; and Mechanically reinforcing the bond strength of the reinforcing material to the substrate.

According to any aspect of the invention, the reinforcing material is preferably a fiber reinforced plastic.

According to any aspect of the invention, the reinforcing material is adhesively attached to the substrate material.

According to any aspect of the invention, the substrate material is preferably concrete.

According to any aspect of the invention, the cover plate is mechanically attached to the substrate.

DETAILED DESCRIPTION OF THE INVENTION

The present invention involves increasing the interfacial bond of an FRP strip or plate (or strips or plates of other reinforcing materials) with a concrete substrate (or masonry or other suitable substrates). The invention combines externally bonded FRPs (EB-FRPs) with a variation on traditional mechanically fastened FRPs (MF-FRPs). No bearing resistance in the FRP is required and the invention can be used with commercially available FRP strips, plates, laminates or sheets.

The process comprises of two main steps. The first step involves adhesively attaching an FRP onto the surface of the substrate concrete. While the FRP may be applied directly to the surface of the concrete structure, near-surface mounting may also be used to attach the FRP to the concrete structure (near-surface mounting involves cutting a groove into the concrete structure, and inlaying the FRP into the groove).

A skilled artisan would know which adhesives would be appropriate for use with specific FRPs or other reinforcing materials, but a commonly used adhesive for bonding FRPs to concrete is an epoxy adhesive. Alternative adhesives that would be suitable are matrices of vinylester, polyester, and other similar compounds.

Figure 2A:
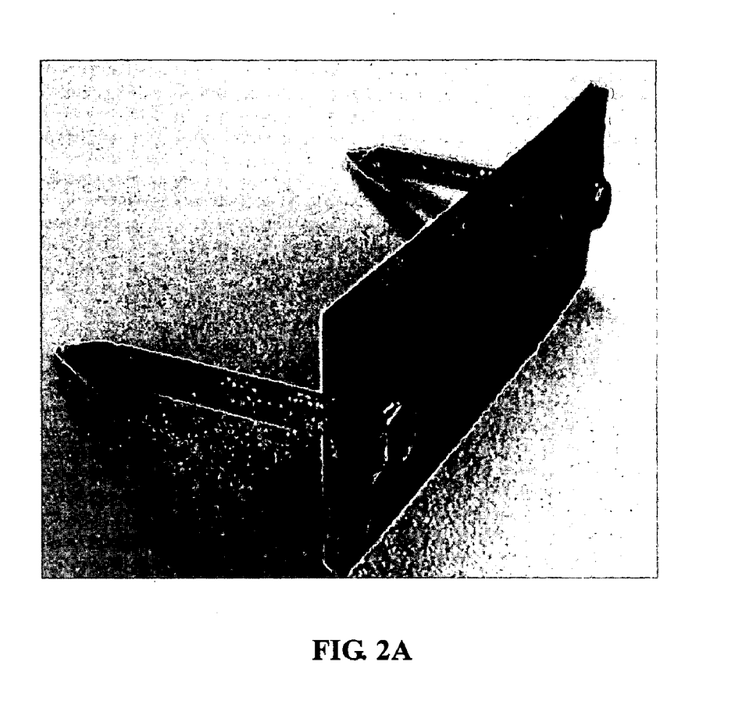
FIG. 2(a) is a photograph of a preferred embodiment of a reinforcing fastener (cover plate) useful in the present invention.
Figure 2B:
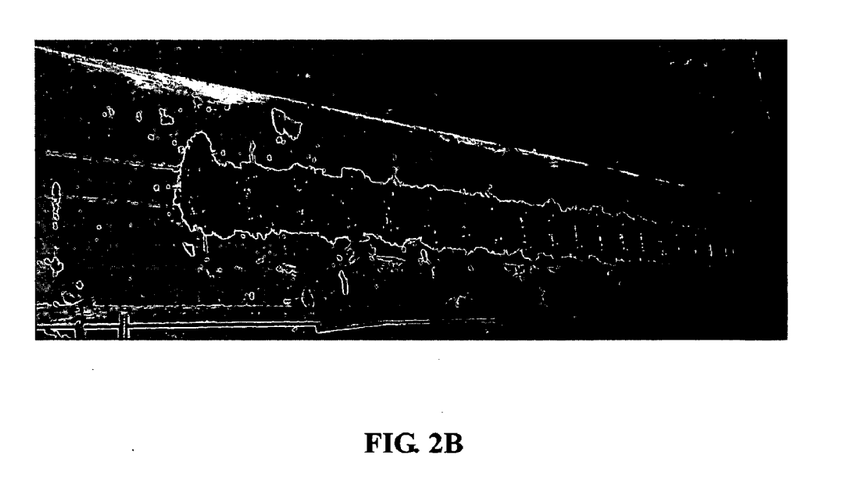
FIG. 2(b) shows a number of cover plates attached to a concrete structure according to a preferred embodiment of the invention. The dark part under the cover plates is the FRP sheet.

The second step involves the attachment of mechanical fasteners along the concrete structure using predetermined spacing. In a particularly preferred embodiment, the mechanical fasteners consist of metal cover plates that are attached to the concrete structure in a configuration whereby each plate is placed along the line of the reinforcing strip or plate strip, but is rotated around 90 degrees (this is best illustrated in FIG. 2(b)). Preferably each cover plate is positioned on top of the reinforcing strip. For wide reinforcing sheets or plates that cover a wide surface area, several rows of cover plates along the direction of the tensile stress may be required.

Externally bonded reinforcing techniques (EB-FRP) have traditionally encountered problems such as premature debonding, leading to an inability to mobilize the full tensile strength of FRP materials. This results in EB-FRPs having a suboptimal strengthening ability. In addition, EB-FRP systems without mechanical fastening are susceptible to acts of vandalism.

The present invention is useful for the structural retrofitting, strengthening, and repairing of reinforced concrete structures. The methods described are capable of mobilising the full tensile strength of FRP materials. Since the preferred mechanical fasteners are relatively thin pieces of steel plate attached to the concrete structure with two normal concrete nails (or other bolts), the additional cost of implementing the new applicant's method is low.

Below are a number of working examples of the invention. These are intended to illustrate to a skilled reader how to effectively implement the method of the invention, and are not intended to limit the scope of the invention in any way. Where particular technical features have been described, equivalents of those features not specifically mentioned (but that would be evident to a skilled artisan) are also intended to be encompassed by the present application.

EXAMPLES

An Mbrace sheet system including a CFRP (carbon FRP) sheet and two parts Saturant manufactured by MBT (Singapore) Pte Ltd was used in the following tests. The Mbrace CF130W CFRP fibre sheet was unidirectional with a nominal thickness of 0.165 mm. The impregnation resin was prepared by mixing Mbrace Saturant Part A and B in a volume ratio of 3:1. The CFRP sheet was first attached to the concrete structure by the traditional EB-FRP method.

In this particular test the mechanical fasteners used were 3 mm thick steel plates having the dimensions of 30 mm by 70 mm.

Figure 3:
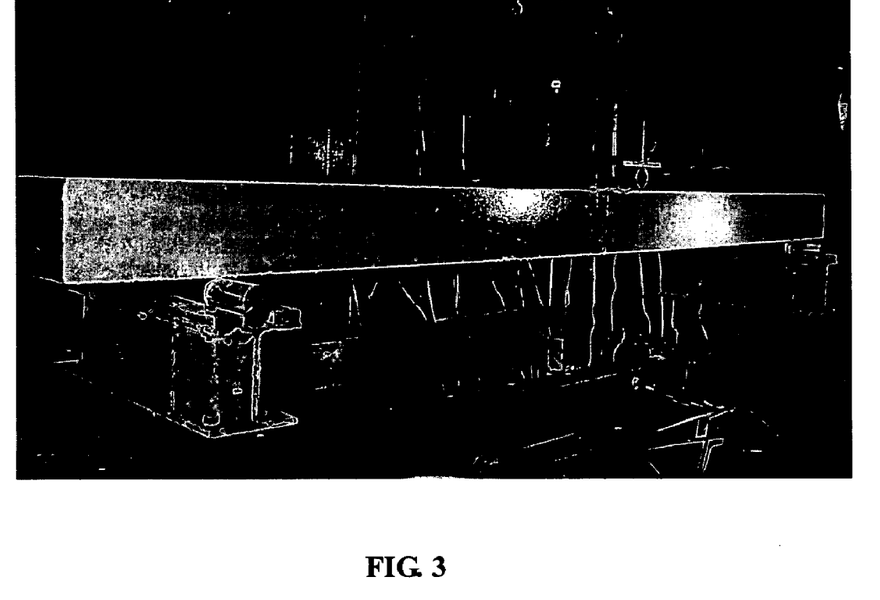
FIG. 3 shows a concrete structure prepared according to the present invention, about to be tested for collapse strength.

To install the cover plates, two small holes for each cover plate were drilled alongside the FRP strip in the concrete structure, with the hole just big enough to house a concrete nail securely. The cover plates were spaced along the length of the FRP strips, approximately 100 mm apart. The test concrete structure after the installation of the FRP and cover plates is shown in FIG. 2(b). The specimens were tested using the setup shown in FIG. 3 to investigate the effectiveness of the applicant's system.

Figure 1:
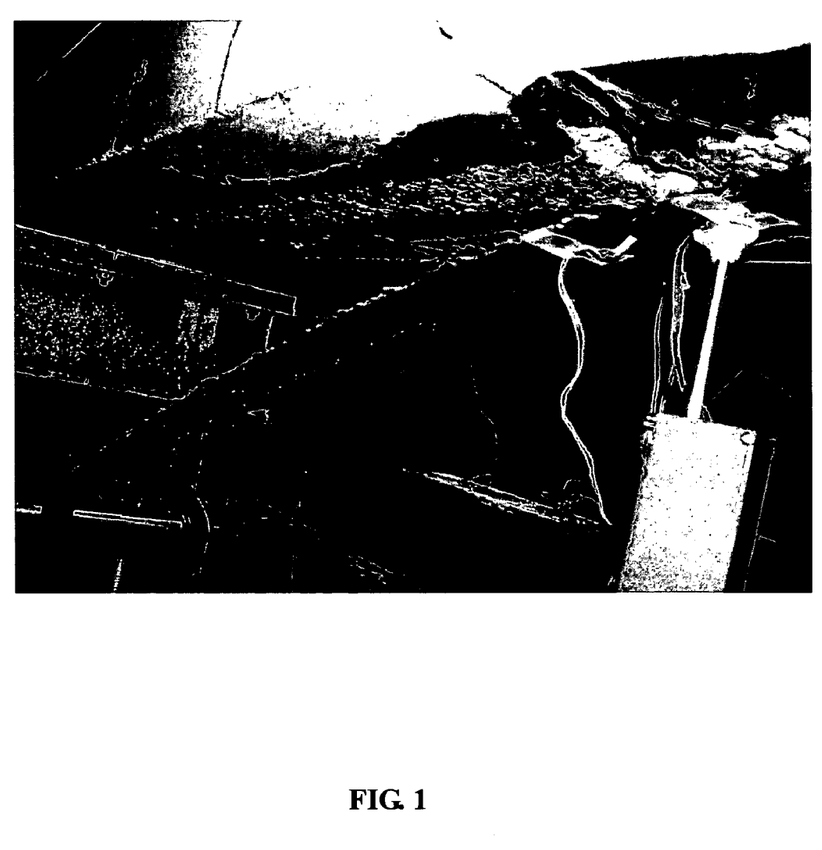
FIG. 1 is a photograph of an externally bonded FRP debonding from the bottom of a concrete beam.
Figure 4:
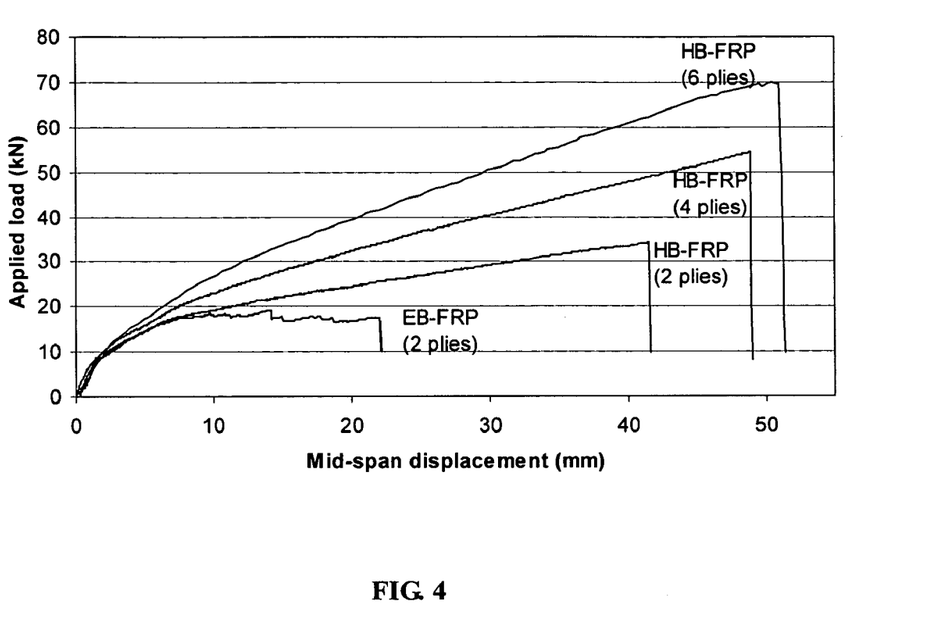
FIG. 4 is a graph comparing the loads applied to different concrete structures before failing. "HB-FRP" (hybrid bonding of FRP) indicates that the concrete structure was reinforced according to the present invention, while "EB-FRP" indicates that the concrete structure was reinforced using known external FRP adhesive bonding techniques.

The effect of the applicant's fastening system was measured, with the results shown in FIG. 4. The lowest curve in FIG. 4 shows the response of the beam strengthened by a conventional EB-FRP method, with 2 plies (layers) of 0.165 mm thick CFRP fabric. The EB-FRP system increased the beam strength from the un-strengthened strength of about 8 kN to 17 kN. The failure of the beam occurred when the FRP strip debonded from the bottom of the beam, as shown in FIG. 1. This indicates that the bond strength was less than that of the tensile break strength of the 2-ply CFRP strip.

Figure 5:
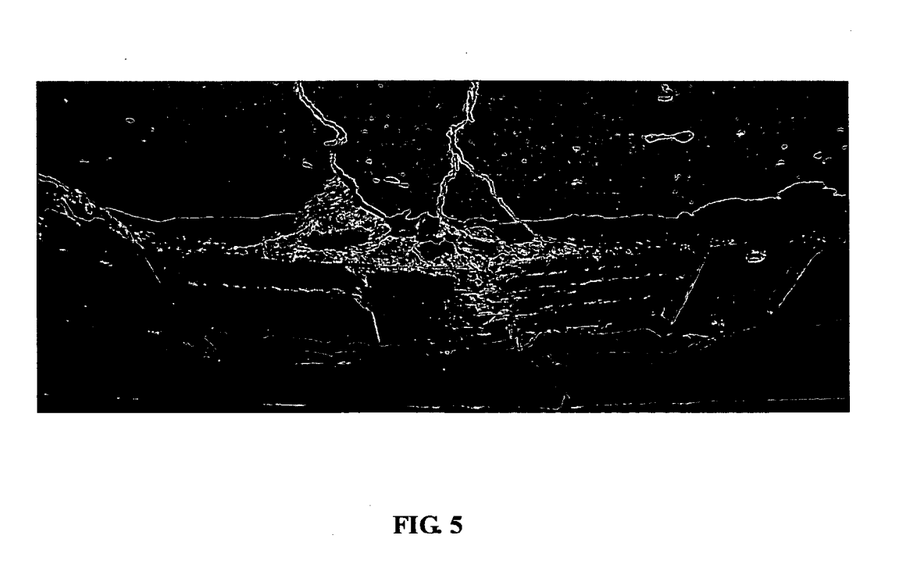
FIG. 5 is a photograph of a concrete structure failure after load testing. It can be seen that the HB-FRP strip itself ruptured in the 2-ply and 4-ply tests.
Figure 6:
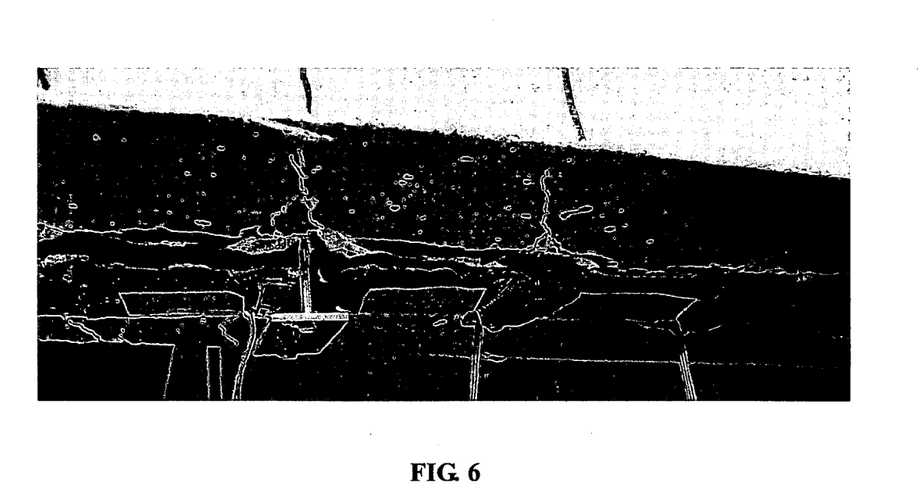
FIG. 6 is a photograph of a concrete structure failure after load testing. It can be seen that the 6-ply test failed due to the debonding of the HB-FRP strip, rather than the rupture of the FRP strip.
Figure 7:
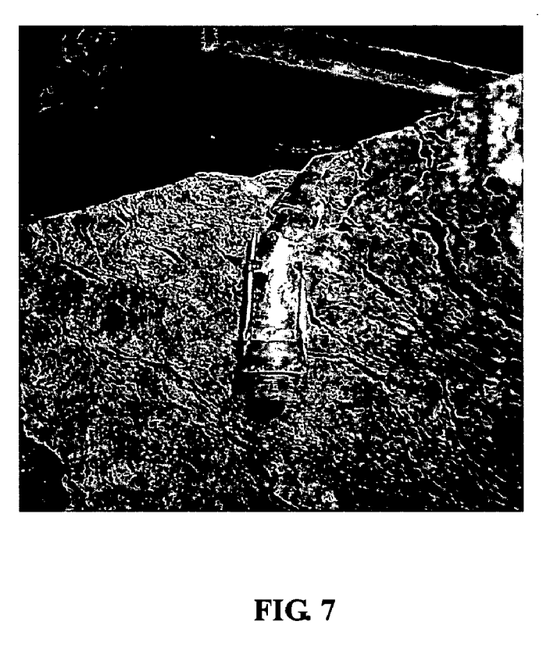
FIG. 7 is a photograph of a conventional mechanical fastener after failure in load testing. It can be seen that the bearing of the reinforcing steel plate on the bolt has led to the deformation of the fastener.
Figure 8:
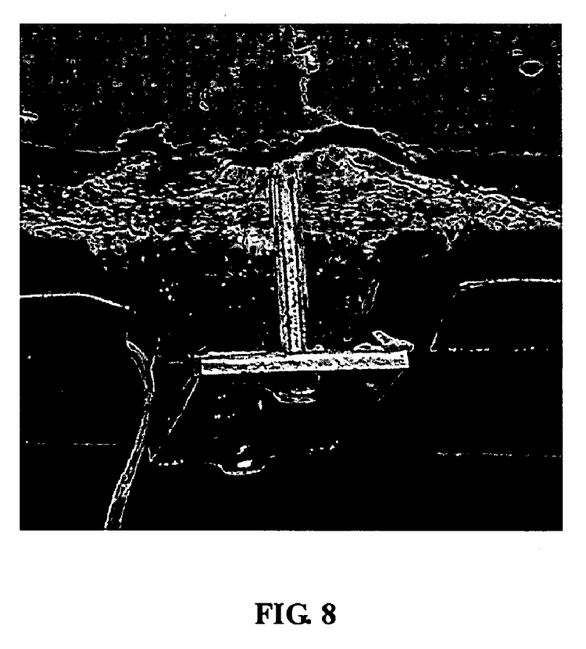
FIG. 8 is a photograph of an embodiment of the invention after failure in load testing. The fastener itself is not deformed, indicating that little or no bearing of the FRP strip on the anchor has taken place.
Figure 9:
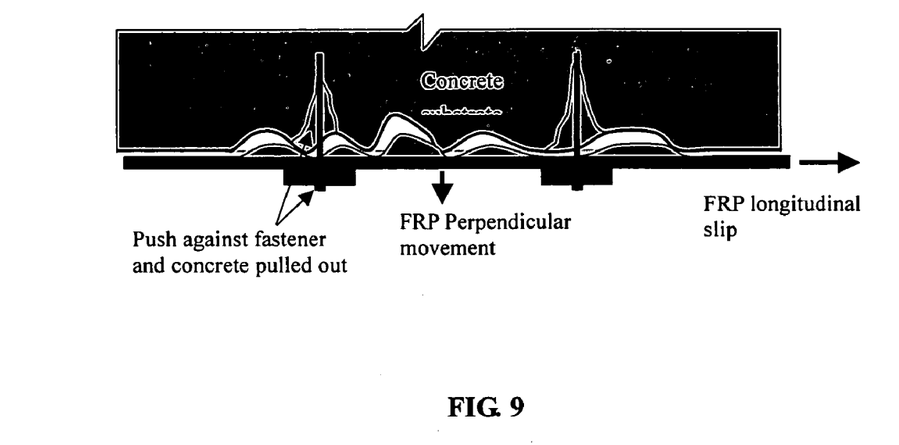
FIG. 9 is a schematic drawing demonstrating the mechanism of HB-FRP debonding from a concrete substrate.
Figure 10:
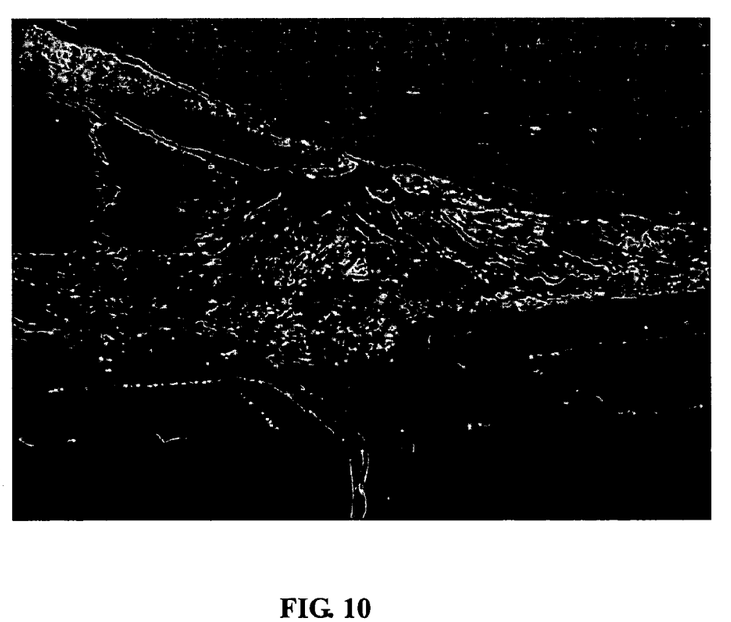
FIG. 10 is a photograph showing a concrete substrate and FRP after debonding has occurred.

The other three responses in FIG. 4 are for beams strengthened with the applicant's system, with 2, 4 and 6 plies of CFRP fabric, respectively. Both the beams with 2 and 4 plies of CFRP failed due to the rupture of the CFRP strip. FIG. 5 is a photograph of a ruptured CFRP strip. This shows that the bond strength with the applicant's system was greater than that of the material tensile strength of the 4-ply CFRP strip and caused the breaking of the CFRP strip itself. The beam with 6-ply CFRP strip failed due to debonding of the strip as shown in FIG. 6. In this case, the bond strength of the applicant's system reached the maximum value, indicating that the tensile strength of the 6-ply CFRP strip was greater than that of the bond strength.

From the testing of the EB-FRP strengthened beam, it was observed that the strength increment of the beam due to EB-FRP system was about 9 kN (from 8 to 17 kN), which means that the bond of the EB-FRP system contributed 9 kN of the beam strength. The highest recorded strength of the applicant's system was 70 kN. Taking away 17 kN contributed by the steel bar and the EB-FRP system, the additional strength due to the applicant's system was therefore 53 kN, which is approximately six times that contributed by the conventional EB-FRP system. It is clear from these results that the applicant's system produces surprising results, which demonstrate that synergism is observed when a concrete structure has an externally bonded FRP in combination with the new mechanical fastening system described.

I claim:

1. A method for reinforcing a concrete structure comprising attaching an amount of reinforcing material onto a concrete or masonry substrate; and attaching a plurality of cover plates at 90° crosswise on top of the reinforcing material, anchoring the plurality of cover plates with mechanical fasteners on opposite sides of the reinforcing material into the substrate only along a length of the reinforcing material.

2. A method according to claim 1 wherein the reinforcing material is attached to the concrete substrate by means of an adhesive.

3. A method according to claim 2 wherein the adhesive is an epoxy resin.

4. A method according to claim 1 wherein the cover plate is a metal cover plate.

5. A method according to claim 4 wherein the cover plate is a steel plate.

6. A method according to claim 1 wherein the plane of the reinforcing material and the plane of the at least one cover plates are parallel.

7. A method according to claim 1 wherein each cover plate is nailed to the substrate.

8. A method according to claim 7 wherein at least two nails are used to attach each cover plate to the substrate.

9. A method according to claim 1 wherein two nails are used to attach at least one cover plate to the substrate.

10. A method according to claim 1 wherein more than two nails are used to attach at least one cover plate.

11. A method according to claim 1 wherein holes are drilled into the substrate prior to the attachment of at least one cover plate.

12. A method according to claim 11 wherein the nails are forced into the drilled holes.

13. A method according to claim 1 wherein nails are forced into the substrate without holes being drilled.

14. A method according to claim 1 wherein concrete nails are used.

15. A method according to claim 1 wherein the reinforcing material is a fiber reinforced plastic.

16. A method according to claim 1 wherein the substrate consists of concrete.

* * * * *